United States Patent [19]

Ishida

[11] 4,089,343
[45] May 16, 1978

[54] AUTOMATIC FLOW CONTROL VALVE ASSEMBLY

[75] Inventor: Mitsuo Ishida, Tokyo, Japan
[73] Assignee: Giken Co., Ltd., Tokyo, Japan
[21] Appl. No.: 701,627
[22] Filed: Jul. 1, 1976
[51] Int. Cl.² ............................................. F16K 31/12
[52] U.S. Cl. ............................ 137/484.8; 137/505.26; 137/505.41; 137/505.42
[58] Field of Search ...................... 137/505.41, 505.40, 137/505.42, 484.8, 505.46, 505.47, 505.26

[56] References Cited

U.S. PATENT DOCUMENTS

| | | | |
|---|---|---|---|
| 1,515,911 | 11/1924 | Terry | 137/484.8 |
| 2,887,123 | 5/1959 | Becker | 137/505.41 X |
| 2,904,068 | 9/1959 | St. Clair | 137/505.41 |
| 3,371,681 | 3/1968 | Thomas | 137/505.42 X |
| 3,791,412 | 2/1974 | Mays | 137/505.42 X |

*Primary Examiner*—Harold W. Weakley
*Attorney, Agent, or Firm*—Blanchard, Flynn, Thiel, Boutell & Tanis

[57] ABSTRACT

A valve assembly for automatically controlling the flow of a fluid comprises a casing having formed therein a first chamber, a second chamber normally communicating with the first chamber and a pressure chamber in constant fluid communication with the second chamber. Means in the form of a bellows or piston is disposed in the pressure chamber to operate a valve member such that communication between the first and second chambers is interrupted upon the increase of the fluid pressure in the latter beyond a normal level.

9 Claims, 6 Drawing Figures

AUTOMATIC FLOW CONTROL VALVE ASSEMBLY

BACKGROUND OF THE INVENTION

The present invention relates to a valve assembly which is located between a first fluid passage and a second fluid passage and which automatically interrupts or controls the flow of a fluid from the first passage to the second passage upon an abrupt increase of the fluid pressure in the latter beyond a normal level.

It is not unusual in everyday life to discharge water or other fluid from the free or outlet end of a hose pipe which has been elastically attached to a water supply faucet or other supply source. A major problem inherent in such a hose connection with a fluid supply source is that a blockage of fluid flow at any portion of the hose, such as would occur when it was unintentionally bent or pressed, develops an excessively high fluid pressure in that part of the hose upstream of the blocked portion to possibly break the hose or detach same from the supply source. An expedient to overcome this problem may comprise a pressure-resistive hose pipe, but this is not only a temporary solution but is costly as well.

An oject of the present invention is to provide an automatic valve assembly which obviates these drawbacks and assures a longer and safer usage of a hose pipe.

Another object of the present invention is to provide an automatic valve assembly which avoids reverse flow of a fluid from a second passage back into the first passage therethrough.

Still another object of the present invention is to provide an automatic valve assembly which permits the use of an ordinary inexpensive hose pipe.

In brief, an automatic valve assembly according to the present invention comprises a casing having a fluid inlet and a fluid outlet, a valve seat formed in the casing to divide the interior of the casing into a first chamber and a second chamber, a valve member engaged with the valve seat, a pressure chamber associated with said casing, a passage providing constant fluid communication between the pressure chamber and the second chamber, an actuating rod disposed between the pressure chamber and the valve member, and a means for biasing the valve member away from the valve seat through the actuating rod. The valve member is brought into engagement with the valve seat through the actuating rod in relation to the operation of pressure chamber when the fluid pressure inside the second chamber has been raised beyond a normal level.

It should be remembered that the fluid to which the valve assembly is applicable may comprise water or gas and the like fluids for instance.

BRIEF DESCRIPTION OF THE DRAWINGS

Other objects and characteristics features of the valve assembly of the present invention will become more apparent from the following description when taken in conjunction with the accompanying drawings, in which.

SUMMARY OF THE INVENTION

Figure 1:
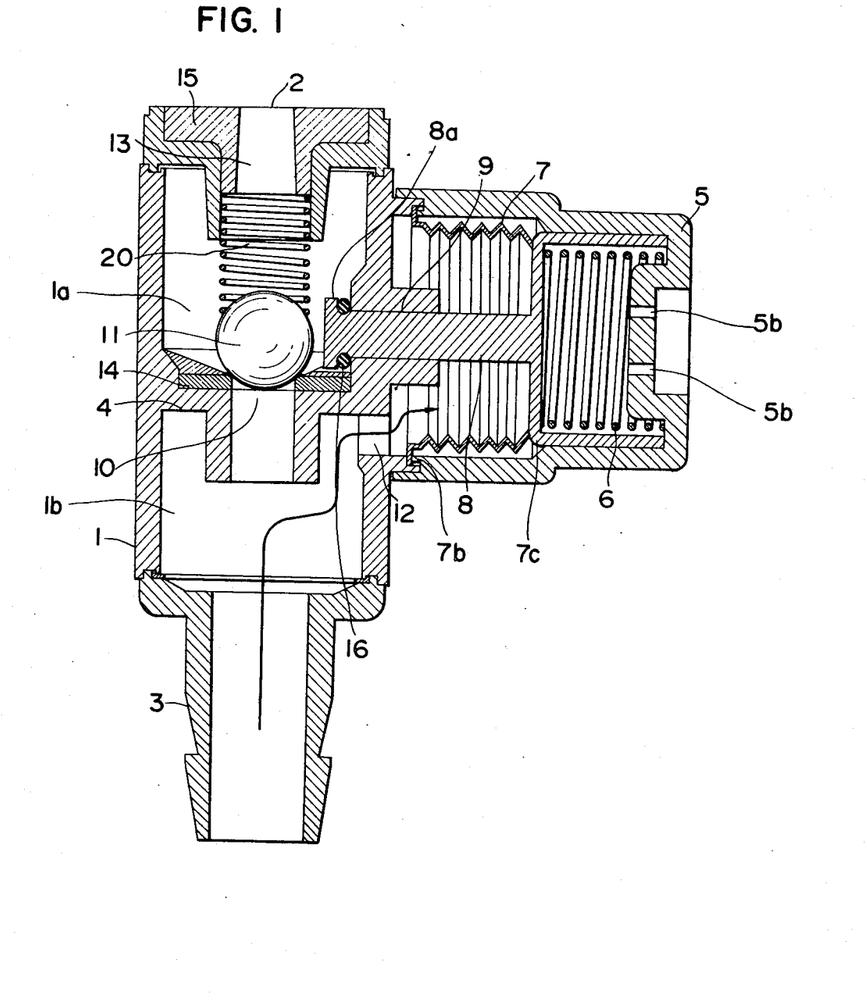
FIG. 1 is a sectional side elevation of a valve assembly according to the present invention in its closed position.
Figure 3:
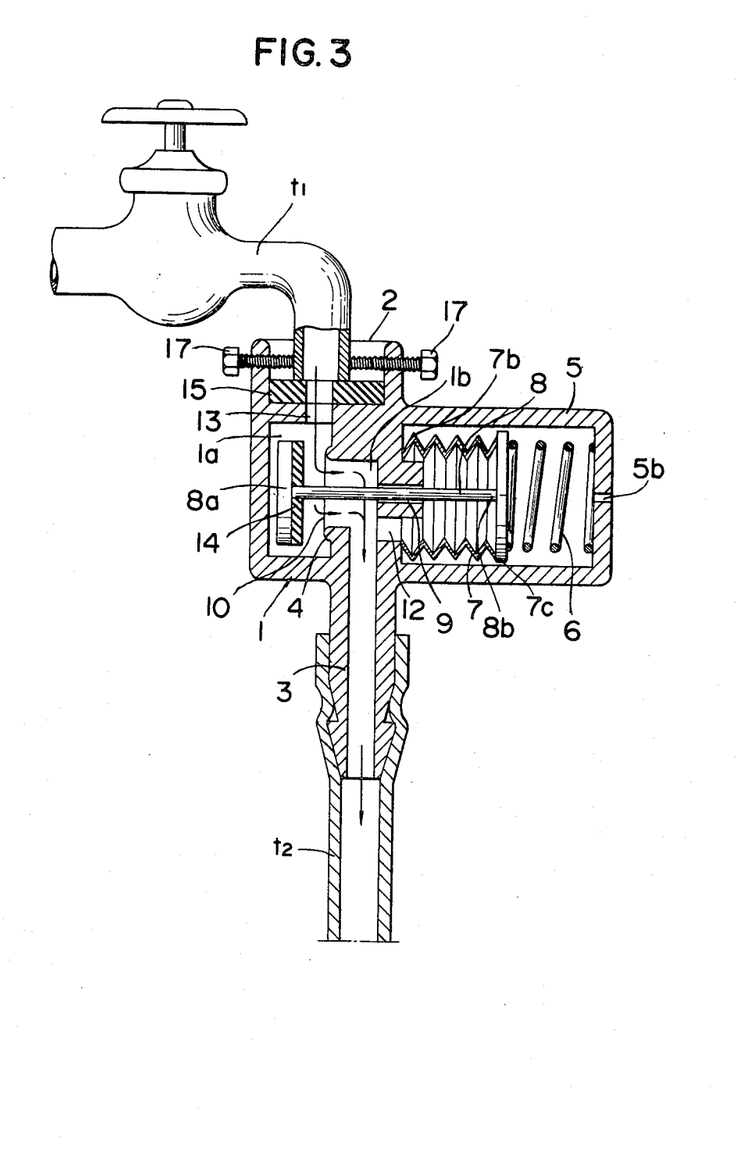
FIG. 3 is a sectional side elevation of another valve assembly according to the present invention in the same position as FIG. 2.
Figure 5:
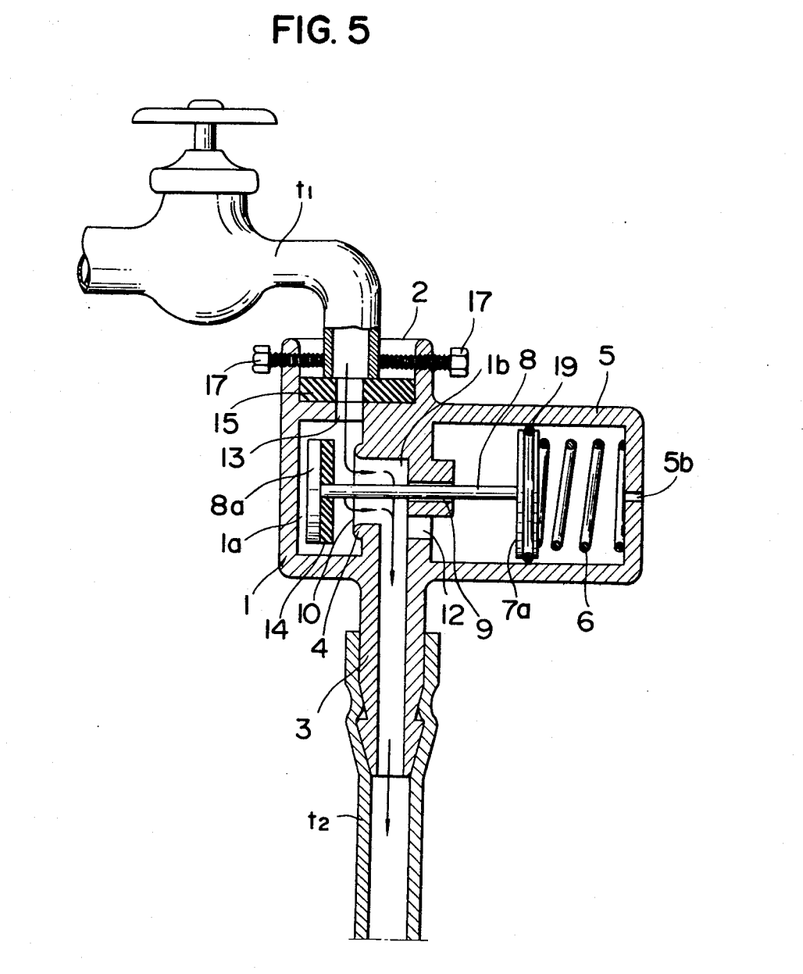
FIG. 5 shows a modified form of the valve assembly indicated in FIGS. 3 and 4 and corresponds to FIG. 3 as to the position.

Now, referring to FIG. 1 of the accompanying drawings, the valve assembly comprises a generally cylindrical casing 1 having portions 2 and 3 at longitudinally opposite ends thereof which are shaped to accommodate their connection with a faucet or the supplying source, $t_1$, and an outlet passage or the hose pipe $t_2$, shown in FIGS. 3 & 5, respectively.

Figure 2:
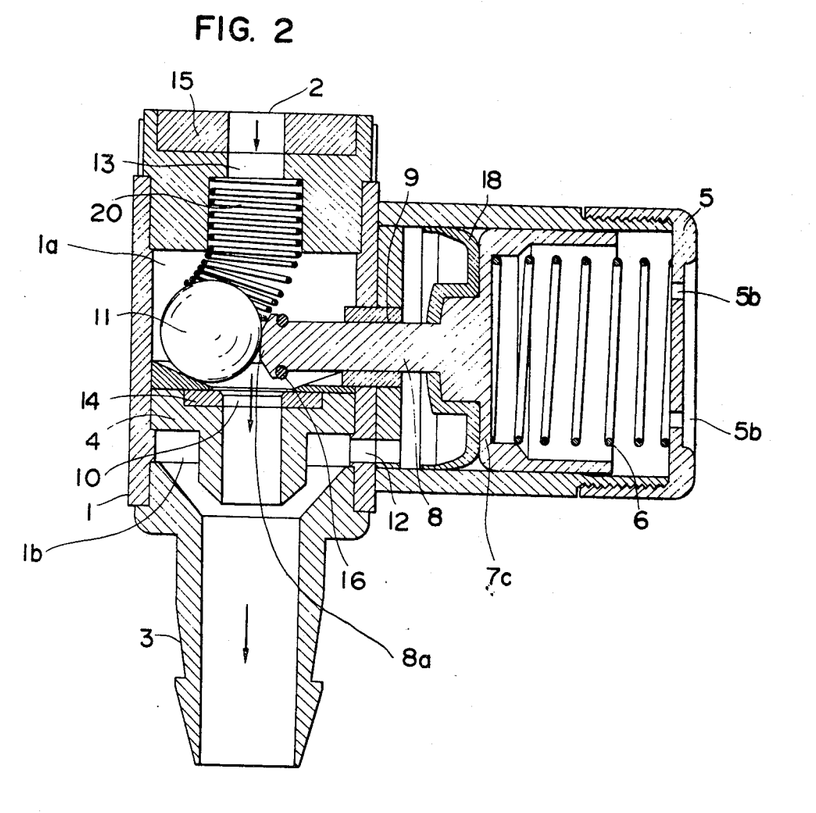
FIG. 2 is a sectional side elevation of a modified form of the valve assembly, in its open position.

The interior of the casing 1 is divided into a first or upper chamber 1a, and a second or lower chamber, 1b, by an annular valve seat, 4, which protrudes radially and inwardly from the casing. A generally cylindrical member 5 is continuous with part of the peripheral wall of the casing 1 and accommodates therein an expansible bellows 7 which normally remains contracted under the bias of a coiled tension spring 6 also accommodated in the member 5 (which position is shown in FIG. 2). The bellows 7 has the circumferential edge at one end 7b thereof rigidly connected to the casing 1 by adhesion, for example, while a base plate or piston 7c is sealedly connected to the other or free end of the bellows 7. The piston 7c on its side opposite that on which the spring 6 bears is connected to one end of an actuating rod 8, and the other end of which projects into the upper chamber 1a of the casing 1 through an opening 9. The interior of the bellows 7 is held in constant fluid communication with the lower chamber 1b of the casing 1 through a passage 12. A spherical valve member or ball 11 is free to move within the upper chamber 1a to block and unblock a passage 10, as defined by the annular valve seat 4 under the action of the actuating rod 8 with the leading end 8a integrally and slidably movable therewith in accordance with expansive and contractive motions of the bellows 7.

The valve assembly is further comprised of a vent holes 5b provided in the member 5 for communicating the interior or pressure chamber of the member 5 with the exterior, a passage 13 through which the fluid will be introduced from the portion 2 of the casing into the upper chamber 1a, a gasket 15 on the portion 2, a gasket 14 provided on the valve seat 4, an O-ring 16 rigidly mounted on the leading end 8a of actuating rod 8 and a plurality of screws 17 (shown in FIGS. 3 & 5) for securing the valve assembly to the faucet $t_1$. Further, there is provided a spring means 20 at the lower internal surface of the portion 2 in such a manner as to extend into the first or upper chamber, 1a, through the opening, 13, to hold the spherical member or ball 11 in a predetermined position.

With this arrangement, the passages $t_1$ and $t_2$ (in FIGS. 3 & 5) normally remain intercommunicated through the passage 10 to permit fluid-flow from the faucet to the outlet and be discharged from the latter as usual. In this situation, the bellows 7 subject to the normal fluid pressure inside thereof remains urged by the spring 6 to the position so that the ball or valve member 11 is pushed by the leading end 8a of an actuating rod 8 which is integral with the piston 7c of the bellows against the wall of upper chamber, 1a, to maintain open the passage 10.

If the flow of fluid through the outlet, $t_2$, is blocked for one reason or another, the continuous flow of fluid from the supply source, $t_1$, causes the fluid pressure inside the hose, $t_2$, to rise beyond a normal level whereupon the pressure communicated into bellows 7 through the passage 12 is increased. The bellows 7 is therefore expanded against tension of the spring 6 with result that the actuating rod 8 is brought into a retracted position in which the valve member 11 is released and is allowed to move to close the opening 10, due to its spherical configuration and fluid pressure acting thereon from the supply source $t_1$. As a result, the fluid is no longer permitted to flow through from the faucet to the outlet in the valve assembly. As the fluid pressure inside the hose $t_2$ is reduced to a normal level by unblocking the fluid flow therethrough, the fluid pressure acting in the bellows 7 is correspondingly reduced so that the spring 6 again urges the bellows back to the contracted position and the actuating rod 8 integral with the free end of the bellows thus extends or advances to push the valve member or ball 11 against the wall of the upper chamber to clear the opening 10 in order to establish communication between the chambers 1a and 1b.

A modified form of the valve assembly shown in FIG. 1 is illustrated in FIG. 2. The modification is essentially similar to the embodiment of FIG. 1 except that the means subject to the action of fluid pressure to urge the valving member or ball through the actuating rod comprises the form of a slidable piston ring, 18, in place of the expansible bellows 7. Parts and elements designated by the same reference numerals as those shown in FIG. 1 correspond to those included in the valve assembly illustrated in FIG. 1.

As for the operation of the valve assembly illustrated in FIG. 2, let it suffice to say, for avoiding unnecessary description, that the piston designated as 7c is slidingly reciprocatable within the cylindrical member or cylinder 5 between expanded and contracted positions to move the valve member 11 by the actuating rod 8, which is provided at its free end with a leading end 8a as previously disclosed and integral therewith in accordance with the level of the fluid pressure developed in the lower chamber 1b and acting thereon through the passage 12 and away from the passage 10 defined by the annular valve seat 4, thereby establishing and interrupting the fluid communication between the upper and lower chambers 1a and 1b of the casing.

Reference numeral 18 in FIG. 2 designates a piston ring or any other equivalent sealing member mounted on the piston 7c in slidable engagement with inner wall of the cylinder 5. Further, there is provided a spring means, 20, which is provided at the lower internal surface of the portion 2 in such a manner as described hereinabove.

It will be appreciated from the foregoing that, in the valve assemblies as depicted in FIGS. 1 and 2, the means responsive to the fluid pressure in the form of a bellows or piston ring is quick to follow any variation in the fluid pressure developed in the receiving passage to ensure positive valve opening and closing motions of the spherical valve member by the actuating rod 8, thus precluding any accident which might otherwise be caused by blockage in the outlet passage.

Figure 4:
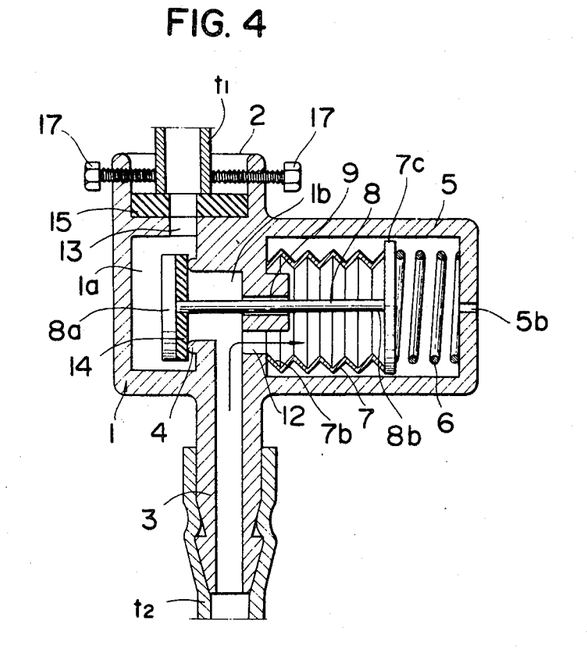
FIG. 4 illustrates the valve assembly shown in FIG. 3 in its closed position.

Another embodiment of the present invention is illustrated in FIGS. 3 and 4. The valve assembly in this embodiment comprises a casing 1 having opposite ends 2 and 3 thereof so shaped as to accommodate their connection with a first or supplying source $t_1$ and a second or outlet passage $t_2$, respectively. In the embodiment shown in FIGS. 3 and 4, the supplying source $t_1$ is in the form of a service water faucet and the outlet passage $t_2$ in the form of a hose pipe. The interior of the casing 1 is divided into a first or upper chamber 1a and a second or lower chamber 1b by an annular valve seat 4 which is in opposing relation to a generally cylindrical member 5 contiguous with part of the peripheral wall of the casing 1. A bellows 7 accommodated in the member 5 is constantly biased by a compression spring 6 (FIG. 3). The upper chamber 1a accommodates therein a generally disc-shaped valve member 8a for blocking and unblocking a passage 10 defined by the annular valve seat 4. A disc or base plate 7c is rigidly mounted to one end of the bellows 7 facing the spring 6 while the other end 7b of the bellows is rigidly connected to the outer periphery of the casing 1 by adhesion. An actuating rod 8 has its one end 8b fixedly mounted to that end of the base plate 7c opposite to that on which the spring 6 bears and extends into the upper chamber 1a through a passage 10 and a guide opening 9, the other end of rod 8 carrying the valve member 8a. The interior of the bellows 7 is held in constant fluid communication with the lower chamber 1b of the casing through a passage 12. Further, designated numeral 13 is a passage through which fluid will be introduced from the upper end 2 of the casing into the upper chamber 1a, and a gasket, 14, adhered to that end of the valve member 8a which is engagable with the valve seat 4, and a gasket, 15, provided at the upper end 2 of the casing 1, and a vent hole, 5b, providing communication between the chamber 5 and the exterior and a plurality of screws, 17, are adapted to mount the valve assembly bodily to the faucet.

In the normal or open position of the valve assembly shown in FIG. 3, the unblocked passage of fluid from the supply source, $t_1$, to the hose pipe, $t_2$, maintains the bellows 7 urged by the spring 6 in its contracted position since the fluid pressure prevailing in the passage $t_2$ and, therefore, in the bellows 7 remains normal. The actuating rod 8 rigid with the base plate 7c of bellows maintains the valve member 8a in a position clear of the valve seat 4 to unblock the opening 10. The intended fluid or water can therefore flow continuously from the supply source to the outlet passage.

When the flow of the fluid through the outlet passage $t_2$ is accidentally blocked, the fluid continuously fed from the supply source $t_1$ rapidly raises the fluid pressure inside the outlet passage $t_2$ with a result that the volume of fluid and, therefore, the fluid pressure communicating into the bellows 7 through the opening 12 is correspondingly increased. The bellows 7 is then expanded against the action of the spring 6 to the position illustrated in FIG. 4 where it retracts the actuating rod 8 to the FIG. 4 position integrally therewith, the valve member 8a carried by the actuating rod 8 thus being brought into abutment against the valve seat 4 to close the flow passage. Consequently, no further flow of fluid from the supply source to the outlet passage is permitted to occur. Thereafter, as the blockage of outlet passage $t_2$ is removed to release fluid from outlet-end thereof with the resultant recovery of normal fluid pressure in the outlet passage, the fluid pressure inside bellows 7 is concurrently reduced due to its fluid communication with lower chamber 1b whereupon the spring 6 again urges the bellows to the position illustrated in FIG. 3. Accordingly, the valve member 8a connected to base plate 7c of bellows 7 through actuating rod 8 is removed out of engagement with the valve seat 4 to allow fluid to flow through a path thus established from upper chamber to lower chamber.

Figure 6:
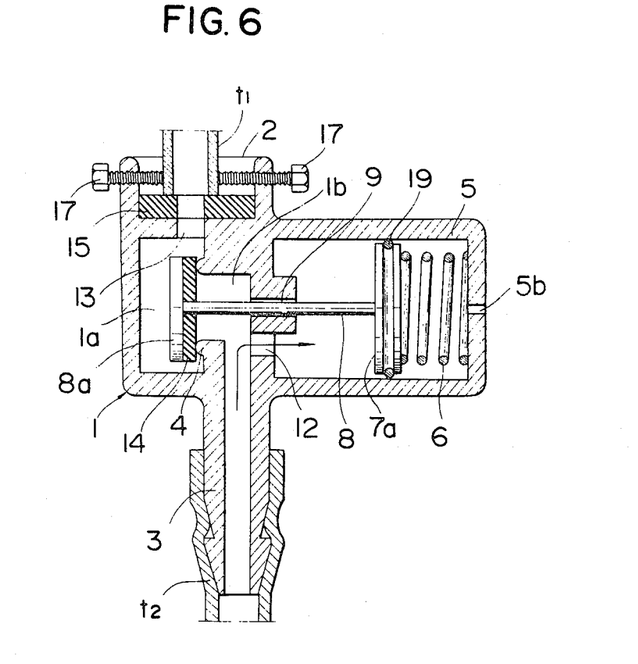
FIG. 6 illustrates the valve assembly of FIG. 5 in the position corresponding to that of FIG. 4.

A modified form of the valve arrangement shown in FIGS. 3 and 4 is depicted in FIGS. 5 and 6. A major difference between the arragements illustrated in FIGS. 3 and 4 and that shown in FIGS. 5 and 6 resides in that the means for operating the valve member through actuating rod in response to fluid pressure acting thereon is provided in the form of a piston instead of bellows 7. The same reference numerals as those indicated in FIGS. 3 and 4 designate the corresponding parts and elements.

It will be readily understood to those skilled in the art that, in operation of the valve assembly illustrated in FIGS. 5 and 6, the piston designated as 7a and having a piston ring or any other suitable sealing member 19 mounted thereon is slidingly reciprocatable within the cylindrical member or cylinder 5 between the advanced position shown in FIG. 5 and the retracted position shown in FIG. 6 to move the valve member 8a by actuating or piston rod 8 integral therewith in accordance with the level of fluid pressure developed in the lower chamber 1b and acting thereon through the passage 12 toward and away from the passage 10 defined by the annular valve seat 4, thereby establishing and interrupting the fluid communication between the upper and lower chambers 1a and 1b.

It will be apparent from the foregoing that in the valve arrangement depicted in FIGS. 3 and 4 and that shown in FIGS. 5 and 6, the valve member opens and closes the corresponding valve passage positively and sufficiently to ensure safe use of a hose pipe since the movements of a bellows or piston subordinate to the variations in fluid pressure developed in the hose are transmitted directly through the integral actuating rod.

It will now be appreciated from the foregoing that a valve assembly in any of the preferred embodiments described hereinabove is capable of avoiding sharp changes in the fluid pressure inside a fluid outlet passage $t_2$ connected with a fluid supply source $t_1$ through the valve assembly, to wit, the maximum impact resulting from so-called "water hammering" effect occurring immediately after any or sudden blockage of the fluid outlet flow. This valve assembly provides a satisfactory countermeasure against disengagement of the outlet passage means or hose, $t_2$, away from the casing end, 3, or to prevent breakage of the former and hence, the use of any pressure-resistive hose which is outproportionally expensive may be eliminated.

What is claimed is:

1. A valve assembly for automatically controlling the flow of a fluid, comprising: a casing having a fluid inlet and a fluid outlet, said casing having wall means defining an elongated laterally enlarged first chamber, a second chamber and a first passage extending longitudinally from the inner end of said first chamber and communicating with said second chamber, said first chamber having at the inner end thereof an annular wall extending transverse to the longitudinal axis of said first chamber and defining a valve seat at one end of said first passage, said wall means also defining a second passage extending sidewardly from said second chamber at a location spaced from said valve seat and located between said valve seat and said outlet; a member defining a pressure chamber extending sidewardly from said casing and being in fluid flow communication with the interior of said casing only through said second passage; a ball disposed in said first chamber for movement along said annular wall and adapted for selectively sealingly engaging said valve seat; a reciprocable actuating rod movable in a direction perpendicular to the longitudinal axis of said first chamber and extending from pressure chamber into said first chamber at a location therein adjacent to and above said annular wall for engagement with said ball for moving said ball along said annular wall in a direction transverse to the longitudinal axis of said first chamber and away from said valve seat; means for causing said ball to sealingly engage said valve seat when said actuating rod is spaced from said ball; biasing means coupled to said actuating rod for biasing same to a position in which said actuating rod contacts said ball and said ball is displaced from said valve seat; and fluid pressure-responsive means in said pressure chamber responsive to fluid pressure supplied through said second passage for overcoming said biasing means to position said actuating rod out of contact with said ball whereby to permit said ball to move into sealing engagement with said valve seat when fluid pressure builds up in said second chamber sufficient to overcome said biasing means.

2. A valve assembly according to claim 1 in which said means for causing said ball to sealingly engage said valve seat comprises a coil spring disposed in said first chamber substantially coaxial with said valve seat and extending in a direction substantially perpendicular to the direction of reciprocation of said actuating rod, the inner end of said coil spring bearing against said ball to resiliently urge same into sealing contact with said valve seat.

3. A valve assembly according to claim 2 in which said first chamber is laterally enlarged to a sufficient extent to permit said ball to be moved along said annular wall by said actuating rod to substantially fully uncover said one end of said first passage.

4. A valve assembly according to claim 3 in which said annular wall is sloped at a small angle from said one end of said first passage substantially to the side of said first chamber.

5. A valve assembly according to claim 1 in which said actuating rod extends through an opening in the side wall of said first chamber adjacent the inner end thereof, and sealing means for sealing said opening.

6. a valve assembly according to claim 1 in which said biasing means is a coil spring disposed at the outer end of said pressure chamber, a piston connected to said actuating rod and slidably disposed in said pressure chamber in substantial sealing relationship therewith, the outer side of said piston being in contact with the inner end of said coil spring.

7. A valve assembly according to claim 6 including an expandable bellows disposed in said pressure chamber with the outer end thereof being sealed to the inner side of said piston and with the inner end of said bellows being fixed with respect to said member that defines said pressure chamber, said second second passage being in communication with the interior of said bellows.

8. A valve assembly according to claim 6 including a piston ring secured to the inner side of said piston and slidably engaging the interior wall of said pressure chamber.

9. A valve assembly according to claim 1 in which said first passage is defined by an annular cylindrical member projecting through the inner end of said second chamber partway toward the opposite end thereof and being radially inwardly spaced from the interior of the sidewall of said second chamber at the inner end thereof, said second passage extending sidewardly through the sidewall of said second chamber at the inner end thereof.

* * * * *